(12) United States Patent
Balamucki et al.

(10) Patent No.: US 6,354,166 B1
(45) Date of Patent: Mar. 12, 2002

(54) AUXILIARY GEAR BOX PISTONS STOPS

(75) Inventors: Tom Balamucki; Landon Ball; Peggy Marie Garrett, all of Laurinburg, NC (US)

(73) Assignee: ZF Meritor, LLC, Maxton, NC (US)

( * ) Notice: Subject to any disclaimer, the term of this patent is extended or adjusted under 35 U.S.C. 154(b) by 0 days.

(21) Appl. No.: 09/571,819

(22) Filed: May 16, 2000

(51) Int. Cl.[7] .............................................. F16H 59/00
(52) U.S. Cl. ........................................... 74/335; 74/745
(58) Field of Search ................................. 74/745, 335

(56) References Cited

U.S. PATENT DOCUMENTS 4,409,859 A * 10/1983 Yarnell ........................ 74/745
5,749,264 A * 5/1998 Broadbent .................... 74/335
5,992,267 A * 11/1999 Smith et al. .................. 74/745
6,202,812 B1 * 3/2001 Semke ......................... 74/335

* cited by examiner

*Primary Examiner*—Dirk Wright
(74) *Attorney, Agent, or Firm*—Carlson, Gaskey & Olds

(57) ABSTRACT

A heavy vehicle transmission auxiliary gear box has a piston housing defining internal fluid chambers. A piston shaft is further included to achieve the gear shifts in the auxiliary gear box. A yoke element is coupled to the shaft for engaging the multi-speed transmission. A piston is disposed on the shaft in the internal fluid chambers to move the shaft and the yoke element between first and second positions. Shoulder elements on the shaft prevent direct contact between the piston and the piston housing when the shaft and the yoke element are actuated between the first and second positions.

17 Claims, 2 Drawing Sheets

AUXILIARY GEAR BOX PISTONS STOPS

BACKGROUND OF THE INVENTION

The subject invention relates to a heavy vehicle transmission auxiliary gear box with a power cylinder that uses housing structure other than the piston as a stop.

Heavy vehicles generally utilize transmissions to achieve selected speeds between an engine and an output shaft. A typical transmission includes a main gear box and an auxiliary gear box. The main gear box may includes five gear ranges that may be selected by a vehicle operator. The auxiliary gear box may include a splitter gear box, a range gear box, or both.

The auxiliary gear box of the typical multi-speed transmission may be actuated automatically based upon system conditions or may be actuated by an operator switch. Range or splitter gear changes in the auxiliary gear box are typically driven by a power cylinder. The power cylinder includes a piston driven by a fluid, such as air. The fluid actuates the piston and drives a collar to select a particular output from the auxiliary gear box. The collar engages gears. In conventional auxiliary gear boxes, the piston directly contacts a housing to define an end of a travel stroke of the piston. To move the collar and engage the gears the piston must be driven with high force. Thus, when the piston directly contacts the housing, the piston realizes severe mechanical forces that tend to degrade the physical integrity of the piston.

It would be desirable to have freedom in the selection of materials for the piston. However, to date, materials must be used that allow the piston to provide the stop at the end of the travel stroke.

SUMMARY OF THE INVENTION AND ADVANTAGES

In a disclosed embodiment, a power cylinder for an auxiliary gear box has a stop structure that does not utilize the piston. A disclosed transmission assembly includes a multi-speed transmission main gear box and an auxiliary gear box coupled to the main gear box. The transmission assembly further includes a power cylinder having a piston housing disposed in the auxiliary gear box. The piston housing defines an internal fluid chamber. A piston shaft extends between proximate and distal ends and is driven between a first position and a second position to effect the shift in the auxiliary gear box. The proximate end of the shaft extends into the internal fluid chamber defined by the piston housing. The distal end of the shaft extends outwardly from the piston housing to a yoke element coupled to the shaft. The yoke element, through interconnection with a collar, selectively engages gears to achieve a desired shift in the auxiliary gear box. In the disclosed embodiment, the auxiliary gear box is a splitter gear box.

The transmission assembly further includes a piston disposed on the proximate end of the shaft. The piston is disposed in the internal fluid chamber to move the shaft and the yoke element between the first position and the second position. The subject invention includes at least one shoulder element extending outwardly from at least one of the ends of the shaft. The shoulder element prevents direct facial contact between the piston and the piston housing when the shaft and the yoke element are actuated between the first and second positions to engage the auxiliary gear box. Preferably, two such shoulder elements define two end of travel stops.

Accordingly, by incorporating at least one shoulder element, the subject invention provides a transmission assembly that prevents the piston from mechanically stopping against the piston housing of the auxiliary gear box. As such, there is greater freedom in the selection of materials for the piston because these materials are not required to withstand impact with the piston housing upon actuation between the first and second positions.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
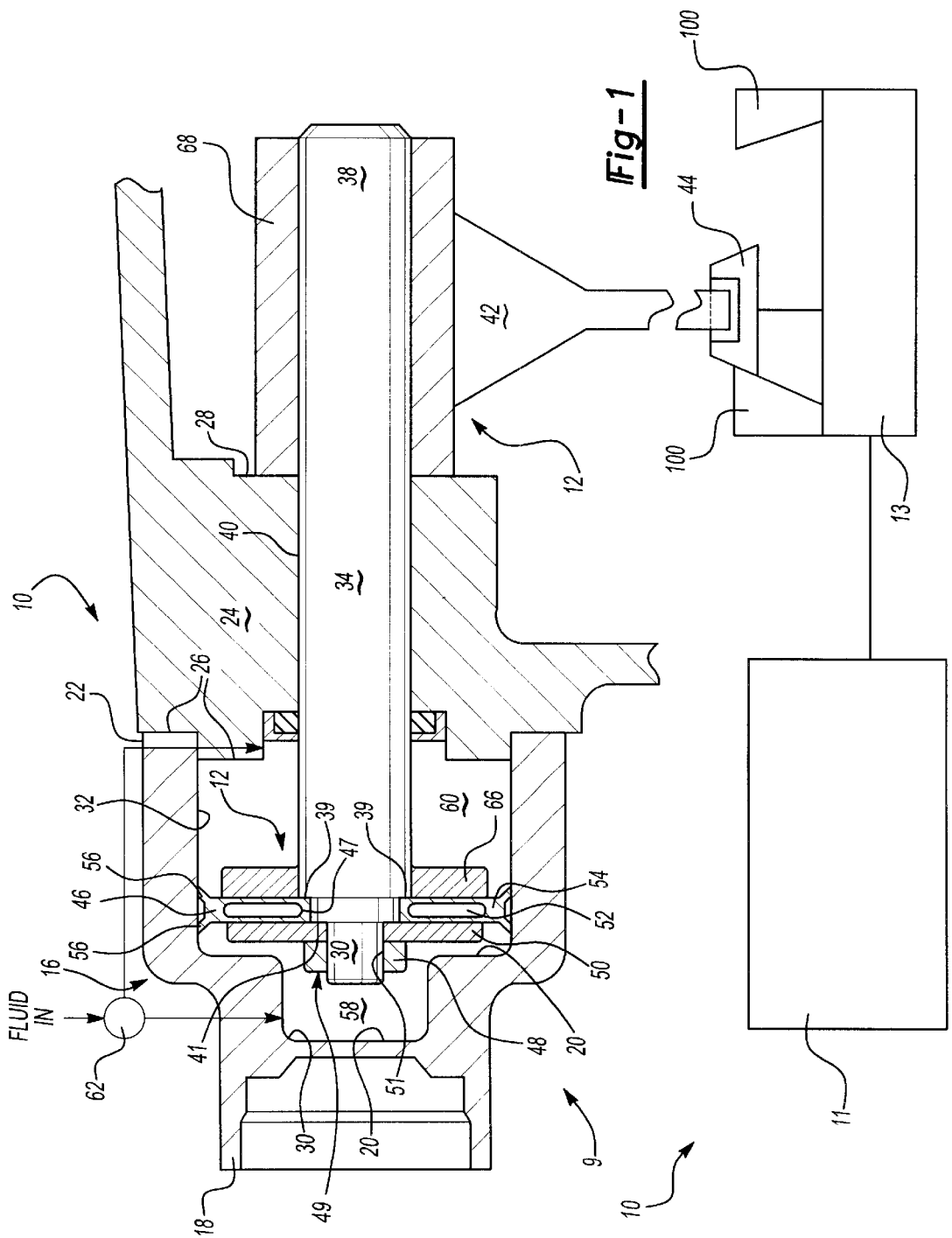
FIG. 1 is a partially cross-sectional schematic view of a transmission assembly including a multi-speed main gear box and an auxiliary gear box in a first position.
Figure 2:
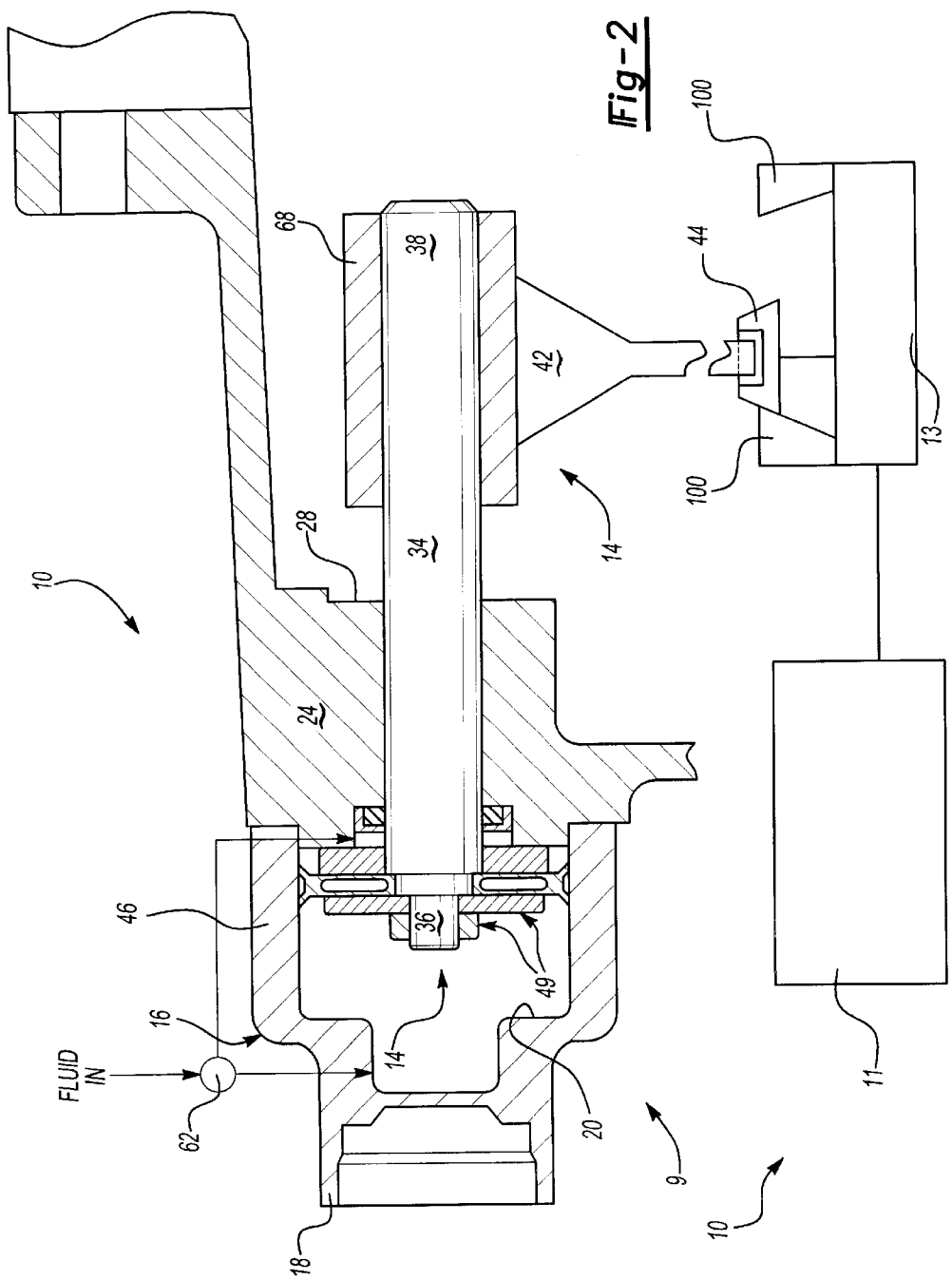
FIG. 2 is a partially cross-sectional schematic view of the transmission assembly including the multi-speed main gear box and the auxiliary gear box in a second position.

Referring to FIGS. 1 and 2, a power cylinder 9 and a transmission assembly 10 for a heavy vehicle are shown. The transmission assembly 10 includes a multi-speed transmission main gear box 11 and an auxiliary gear box 13. The auxiliary gear box 13 is coupled to the main gear box 11 as known in the art. It is to be understood that FIGS. 1 and 2 are highly schematic and the invention may be arranged in a manner other than shown. For instance, as shown in the Figures, the power cylinder 9 is external to the auxiliary gear box 13. However, it is to be understood that the power cylinder 9 may be disposed within the auxiliary gear box 13 without varying the scope of the subject invention. Also, the size of the main gear box 11 and the auxiliary gear box 13 are much smaller than they would be relative to the power cylinder 9. The auxiliary gear box 13 of the transmission assembly 10 reciprocates between a first position 12 (FIG. 1) and a second position 14 (FIG. 2) to effect a desired shift in the auxiliary gear box 13. The auxiliary gear box 13 as shown in FIG. 1 may be a splitter gear box. Although not shown, the auxiliary gear box 13 could be a range gear box without varying the scope of the subject invention.

The transmission assembly 10 includes a piston housing 16 disposed in the auxiliary gear box 13. The piston housing 16 includes a piston cylinder 18 having first 20 and second 22 ends, and an auxiliary housing 24 having first 26 and second 28 abutment surfaces. The piston housing 16 generally defines an internal fluid chamber 30 having an inner surface 32. More specifically, the first abutment surface 26 of the auxiliary housing 24 abuts the second end 22 of the piston cylinder 18 to further define the internal fluid chamber 30.

The transmission assembly 10 further includes a shaft 34 having proximate 36 and distal 38 ends. The shaft 34 also includes an abutment element 39 and a step portion 41. More specifically, the abutment element 39 extends outwardly from the proximate end 36 of the shaft 34, and the step portion 41 of the shaft 34 is included at the proximate end 36. The shaft 34 extends through a bore 40 of the auxiliary housing 24 and reciprocates between the first position 12 and the second position 14. The proximate end 36 of the shaft 34 extends into the internal fluid chamber 30, and the distal end 38 of the shaft 34 extends through the bore 40 outwardly from the piston housing 16. Preferably, the shaft 34 is cylindrical in shape. However, the shaft 34 may be any other shape effect the desired shift between the low and high gear ranges of the auxiliary gear box 13 without varying the scope of the subject invention.

The transmission assembly 10 further includes a yoke element 42 coupled to the distal end 38 of the shaft 34. The yoke element 42 is adapted for engaging one of two gears 100, shown schematically, when the shaft 34 is reciprocated between the first 12 and second 14 positions to achieve a desired splitter ratio. Preferably, the yoke element 42 is coupled to the distal end 38 of the shaft 34 via machine screws. However, the yoke element 42 may be coupled to the shaft 34 by other means, such as welding, suitable to securely couple the yoke element 42 to the shaft 34. A collar 44 is interconnected with the yoke element 42 to engage gears 100. It is to be understood that the Figures represent the collar 44 of the subject invention schematically, and the collar 44 may be interconnected with yoke element 42 and gears 100 in a manner other than as shown.

The transmission assembly 10 further includes a piston 46 disposed on the proximate end 36 of the shaft 34 in the internal fluid chamber 30. The piston 46 includes a piston bore 47 where the proximate end 36 of the shaft 34 extends through the piston 46. In mounting the piston 46 on the shaft 34, the piston 46 is positioned on the step portion 41 of the shaft 34 where the step portion 41 of the shaft 34 supports the piston bore 47 as the piston 46 is retained against the abutment element 39 of the shaft 34.

A retaining device 49 is placed on the proximate end 36 of the shaft 34 to secure the piston 46 against the abutment element 39. In a preferred embodiment of the subject invention, the retaining device 49 is constructed of metal, most preferably steel. More specifically, the retaining device 49 includes a locking member 48 and a spacing element 50. The locking member 48 is disposed on the proximate end 36 of the shaft 34 to secure the piston 46 on the shaft 34. Preferably, the locking member 48 is a nut threaded onto a threaded segment 51 of the shaft 34. However, the scope of the subject invention is not varied by utilizing a locking member 48 other than a nut affixed on a threaded segment 51 of the shaft 34. The subject invention further includes a spacing element 50 disposed on the proximate end 36 of the shaft 34 to properly position the piston 46 relative to the shaft 34.

Piston 46 moves the shaft 34 and the yoke element 42 between the first 12 and second 14 positions. The piston 46 includes a core 52 constructed of plastic. The core 52 of the piston 46 is coated with a rubber to form an exterior 54 of the piston 46. The exterior 54 of the piston 46 includes a plurality of webs 56 formed from the same rubber. The piston 46 mates with the inner surface 32 of the internal fluid chamber 30 to divide the internal fluid chamber 30 into first 58 and second 60 internal fluid chambers. The webs 56 of the piston 46 form a seal with the inner surface 32 of the internal fluid chamber 30. Details of the piston 46 can be better understood from co-pending U.S. patent application Ser. No. 09/571,901, entitled "Non-Metallic Piston In A Heavy Vehicle Transmission And Method Of Assembling The Piston" filed on May 16, 2000 and assigned to the same assignee as this application.

In operation, to reciprocate the shaft 34 between the first 12 and second 14 positions, the subject invention incorporates a valve 62 to selectively direct fluid into one of the internal fluid chambers 58, 60 to displace the piston 46 thereby actuating the shaft 34. The valve 62 is one example of how to displace the piston 46 and actuate the shaft 34. Other devices incorporating the subject invention may utilize a spring instead of fluid to move the piston 46 between the first 12 and second 14 positions. The details of the control of fluid into the chambers 58, 60 may be as known.

To prevent the piston 46 from mechanically stopping against the auxiliary housing 24 of the piston housing 16, the subject invention includes shoulder elements 66, 68 extending outwardly from ends 36, 38 of the shaft 34 to prevent direct contact between the piston 46 and the auxiliary housing 24 when the shaft 34 and the yoke element 42 are actuated between the first 12 and second 14 positions. That is, the subject invention incorporates shoulder elements 66, 68 to prevent direct contact between the piston 46 and the first abutment surface 26 of the auxiliary housing 24 or to prevent direct facial contact between the spacing element 50, and the piston 46, and the first end 20 of the piston cylinder 18. In a preferred embodiment of the subject invention, the shoulder elements 66, 68 are constructed of metal, most preferably steel.

As discussed above, the preferred embodiment includes first 66 and second 68 shoulder elements. The first shoulder element 66 extends outwardly from the proximate end 36 of the shaft 34 and directly contacts the auxiliary housing 24 when the shaft 34 and the yoke element 42 are in the second position 14. The first shoulder element 66 preferably extends circumferentially outward from the proximate end 36 of the shaft 34. As a result, direct contact between the auxiliary housing 24 and the piston 46 is prevented. As shown in FIG. 1, the first shoulder element 66 extends outwardly from the abutment element 39 at the proximate end 36 of the shaft 34. However, it is to be understood that the abutment element 39 and the first shoulder element 66 may be a single, continuous element extending outwardly from the proximate end 36 of the shaft 34 without varying the scope of the subject invention.

More specifically, the first shoulder element 66 is disposed between the piston 46 and the first abutment surface 26 of the auxiliary housing 24 to prevent direct contact between the piston 46 and the first abutment surface 26 when the shaft 34 and the yoke element 42 are in the second position 14. As such, the piston 46 is disposed on the proximate end 36 of the shaft 34 to abut the first shoulder element 66. The spacing element 50 introduced above is disposed on the proximate end 36 of the shaft 34 between the locking member 48 and the piston 46. The spacing element 50 is disposed on the shaft 34 abutting the step portion 41 to cause the piston 46 to abut the first shoulder element 66 and to retain the piston 46 firmly against the first shoulder element 66. Since the piston 46 does not directly contact the auxiliary housing 24 and the piston 46 is retained firmly against the first shoulder element 66, the piston 46 can be constructed of non-metallic materials that are not required to withstand impact with the piston housing 16.

The second shoulder element 68 extends outwardly from the distal end 38 of the shaft 34 and directly contacts the auxiliary housing 24 when the shaft 34 and the yoke element 42 are in the first position 12. As a result, direct contact between the spacing element 50 and the piston 46, and the first end 20 of the piston cylinder 18 is prevented. More specifically, the second shoulder element 68 is disposed at the distal end 38 of the shaft 34 to directly contact the second abutment surface 28 of the auxiliary housing 24 as the shaft 34 and the yoke element 42 return from the second position 14 to the first position 12.

As FIG. 1 shows, the second shoulder element 68 preferably extends circumferentially outward from the distal end 38 of the shaft 34. Note that in the preferred embodiment, the yoke element 42 is coupled to the distal end 38 of the shaft 34 by the second shoulder element 68, and the collar 44, which engages the auxiliary gear box 13 when the shaft 34 and the yoke element 42 are actuated between the first 12 and second 14 positions, is interconnected with the yoke element 42 opposite the second shoulder element 68.

As with the first shoulder element 66, since the piston 46 does not directly contact the auxiliary housing 24, the piston 46 may be constructed of non-metallic materials that are not required to withstand impact with the auxiliary housing 24. As a difunctional matter, the "piston" as the term is used throughout this application, is the part moving with the shaft 34 having an outer periphery surface that contacts the internal fluid chamber 30 of the piston housing 16. Since there is such sealing contact, it is important to note that the contact eliminated by this invention is facial contact between the piston 46 and the auxiliary housing 24, and between the piston 46 and the piston cylinder 18 at the end of travel positions. This allows the use of more materials for the piston 46 which no longer must withstand the forces.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A transmission assembly for a heavy vehicle, said assembly comprising:
   a multi-speed main gear box;
   an auxiliary gear box coupled to said main gear box;
   a piston housing disposed in said auxiliary gear box, said piston housing defining internal fluid chambers;
   a shaft having proximate and distal ends, said proximate end of said shaft extending into said internal fluid chambers, and said distal end of said shaft extending outwardly from said piston housing;
   a yoke element coupled to said shaft outwardly of said piston housing adapted for engaging said auxiliary gear box;
   a non-metallic piston disposed on said shaft in said internal fluid chambers for moving said shaft and said yoke element between a first position and a second position, said yoke element achieving distinct gear ratios when in said first and second positions; and
   at least one metallic shoulder element extending outwardly from said shaft to prevent direct facial contact between both said piston and said piston housing when said shaft and said yoke element are actuated between said first and second positions.

2. An assembly as set forth in claim 1 wherein said at least one shoulder element includes a first shoulder element extending outwardly from said shaft in said internal fluid chambers and directly contacting said piston housing when said shaft and said yoke element are in said second position to prevent direct facial contact between said piston housing and said piston.

3. An assembly as set forth in claim 2 wherein said first shoulder element extends circumferentially outward from said shaft.

4. An assembly as set forth in claim 1, wherein said at least one shoulder element is formed of steel.

5. An assembly as set forth in claim 4, wherein said piston is at least partially formed of a plastic.

6. A transmission assembly for a heavy vehicle, said assembly comprising:
   a multi-speed main gear box;
   an auxiliary gear box coupled to said main gear box;
   a piston housing disposed in said auxiliary gear box, said piston housing defining internal fluid chambers;
   a shaft having proximate and distal ends, said proximate end of said shaft extending into said internal fluid chambers, and said distal end of said shaft extending outwardly from said piston housing;
   a yoke element coupled to said shaft outwardly of said piston housing adapted for engaging said auxiliary gear box;
   a piston disposed on said shaft in said internal fluid chambers for moving said shaft and said yoke element between a first position and a second position, said yoke element achieving distinct gear ratios when in said first and second positions;
   at least one shoulder element extending outwardly from said shaft to prevent direct facial contact between said piston and said piston housing when said shaft and said yoke element are actuated between said first and second positions;
   said at least one shoulder element includes a first shoulder element extending outwardly from said shaft in said internal fluid chambers and directly contacting said piston housing when said shaft and said yoke element are in said second position to prevent direct facial contact between said piston housing and said piston; and
   said piston is disposed on said proximate end of said shaft abutting said first shoulder element.

7. An assembly as set forth in claim 6 further including a retaining device disposed on said proximate end of said shaft to secure said piston on said shaft.

8. A transmission assembly for a heavy vehicle, said assembly comprising:
   a multi-speed main gear box;
   an auxiliary gear box coupled to said main gear box;
   a piston housing disposed in said auxiliary gear box, said piston housing defining internal fluid chambers;
   a shaft having proximate and distal ends, said proximate end of said shaft extending into said internal fluid chambers, and said distal end of said shaft extending outwardly from said piston housing;
   a yoke element coupled to said shaft outwardly of said piston housing adapted for engaging said auxiliary gear box;
   a piston disposed on said shaft in said internal fluid chambers for moving said shaft and said yoke element between a first position and a second position, said yoke element achieving distinct gear ratios when in said first and second positions;
   at least one shoulder element extending outwardly from said shaft to prevent direct facial contact between said piston and said piston housing when said shaft and said yoke element are actuated between said first and second positions;
   said at least one shoulder element includes a first shoulder element extending outwardly from said shaft in said internal fluid chambers and directly contacting said piston housing when said shaft and said yoke element are in said second position to prevent direct facial contact between said piston housing and said piston; and said at least one shoulder element further includes a second shoulder element extending outwardly from said shaft outwardly of said piston housing and directly contacting said piston housing when said shaft and said yoke element are in said first position to prevent direct facial contact between said piston housing and said piston.

9. An assembly as set forth in claim 8 wherein said second shoulder element extends circumferentially outward from said distal end of said shaft.

10. An assembly as set forth in claim 9 wherein said yoke element is coupled to said distal end of said shaft by said second shoulder element.

11. An assembly as set forth in claim 8 wherein said piston housing comprises a piston cylinder having first and second ends, and an auxiliary housing.

12. An assembly as set forth in claim 11 wherein said first shoulder element is disposed between said piston and an abutment surface of said auxiliary housing to prevent direct contact between said piston and said abutment surface when said shaft and said yoke element are in said second position.

13. An assembly as set forth in claim 12 wherein said second shoulder element is disposed at said distal end of said shaft to prevent direct contact between said piston and said first end of said piston cylinder when said shaft and said yoke element are in said first position.

14. A transmission assembly for a heavy vehicle, said assembly comprising:

a multi-speed main gear box;

an auxiliary gear box coupled to said main gear box;

a piston housing disposed in said auxiliary gear box, said piston housing defining internal fluid chambers;

a shaft having proximate and distal ends, said proximate end of said shaft extending into said internal fluid chambers, and said distal end of said shaft extending outwardly from said piston housing;

a yoke element coupled to said shaft outwardly of said piston housing adapted for engaging said auxiliary gear box;

a piston disposed on said shaft in said internal fluid chambers for moving said shaft and said yoke element between a first position and a second position, said yoke element achieving distinct gear ratios when in said first and second positions;

at least one shoulder element extending outwardly from said shaft to prevent direct facial contact between said piston and said piston housing when said shaft and said yoke element are actuated between said first and second positions; and said at least one shoulder element extends outwardly from said shaft outwardly of said piston housing and directly contacts said piston housing when said shaft and said yoke element are in said first position to prevent direct facial contact between said piston housing and said piston.

15. An assembly as set forth in claim 14 wherein said shoulder element extends circumferentially outward from said distal end of said shaft.

16. An assembly as set forth in claim 15 wherein said yoke element is coupled to said distal end of said shaft by said second shoulder element.

17. A transmission assembly for a heavy vehicle, said assembly comprising:

a multi-speed main gear box;

an auxiliary gear box coupled to said main gear box;

a piston housing disposed in said auxiliary gear box, said piston housing defining internal fluid chambers;

a shaft having proximate and distal ends, said proximate end of said shaft extending into said internal fluid chambers, and said distal end of said shaft extending outwardly from said piston housing;

a yoke element coupled to said distal end of said shaft outwardly of said piston housing adapted for engaging said auxiliary gear box;

a piston disposed on said proximate end of said shaft in said internal fluid chambers for moving said shaft and said yoke element between a first position and a second position, said yoke element achieving distinct gear rations when in said first and second positions; and first and second shoulder elements, said first shoulder element extending circumferentially outward from said shaft in said internal fluid chambers and directly contacting said piston housing when said shaft and said yoke element are in said second position to prevent direct facial contact between said piston housing and said piston, and said second shoulder element extending circumferentially outward from said distal end of said shaft outwardly of said piston housing and directly contacting said piston housing when said shaft and said yoke element are in said first position to prevent direct facial contact between said piston housing and said piston.

* * * * *